UNITED STATES PATENT OFFICE.

JOHN AVIL AND WILLIAM PUGH, OF PHILADELPHIA, PENNSYLVANIA, ASSIGNORS TO EMMONS T. MOCKRIDGE, OF SAME PLACE.

IMPROVEMENT IN COMPOSITIONS FOR SIZING AND WATERPROOFING PAPER.

Specification forming part of Letters Patent No. 154,575, dated September 1, 1874; application filed May 9, 1874.

*To all whom it may concern:*

Be it known that we, JOHN AVIL and WILLIAM PUGH, of the city and county of Philadelphia and State of Pennsylvania, have invented a certain Composition for Sizing and Waterproofing Paper, of which the following is a specification:

This invention consists in a compound of certain chemicals and ingredients, hereinafter named, to be mixed and incorporated as a sizing with the pulp from which the paper is to be made, to render the paper water-proof, the proportions being varied according to the different uses for which the paper is designed and the nature of the materials of which the pulp is made. For this purpose we have devised the following mixture and method of preparation, viz:

We dissolve, say, twenty-five (25) pounds of soda in, say, thirty-one (31) gallons of water by boiling. To this liquor add gradually, say, twelve (12) pounds of recently-burned lime, mixed in a small quantity of water. Let this boil about an hour, and then allow it to settle, and pour off the clear liquor, which should be a caustic lye of 36° Baumé. Melt, say, fifty-six (56) pounds of lard or tallow by a gentle heat, and add, say, fourteen (14) pounds of the above-named lye, stirring well, and not allowing it to boil. When thoroughly mixed, add, say, fourteen (14) pounds more of the lye, stirring constantly, and not allowing it to get to a higher temperature than 148° Fahrenheit. To this add, say, fifty-six (56) pounds of glue, dissolved in, say, twenty-eight (28) pounds of caustic lye, at 18° Baumé, by a gentle heat. Stir well until the whole is a homogeneous paste; then add, say, sixteen (16) ounces of bichromate of potash, dissolved in a small quantity of hot water, and finally add, say, sixteen (16) pounds of linseed-oil. Stir continually for about half an hour, and then run it into a frame or box, and keep it covered closely for about twelve (12) hours. This size should be made a few days before using.

By this method of making the size the glycerine of the fat is retained, and forms with the glue a compound very much like india-rubber, which adds greatly to the strength and elasticity of the paper.

To use the size, we dissolve, say, three (3) pounds of it in two (2) gallons of water for a two-hundred-and-fifty-pound engine, and when thoroughly incorporated with the pulp add, say, twenty (20) pounds of alum and ten (10) pounds of acetate of lead; or, in place of the alum and acetate of lead, add, say, twenty (20) pounds of sulphate of iron; or, again, say, ten (10) pounds of chloride of lime and one-fifth ($\frac{1}{5}$) of a pound of bichromate of potash, or varying the proportions of these according to the nature of the pulp materials.

When preparing the size for ledger or writing paper we omit the linseed-oil, and instead thereof we use one (1) ounce of lime, in the form of milk of lime, and two (2) ounces of hyposulphite of soda, dissolved in a small quantity of hot water, to every pound of the size, and mix thoroughly. For straw paper, we use the size with the oil, retaining the lime-water used in boiling the straw, using the alum as usual. For photograph-paper, we prepare the size the same as for writing-paper, except that we omit the alum in the engine, and use instead two pails of milk of lime to the two-hundred-and-fifty-pound engine.

We claim—

The composition for sizing and waterproofing paper, consisting of water, soda, lime, lard or tallow, glue, bichromate of potash, and linseed-oil, in substantially the relative proportions above set forth, to which are added alum and acetate of lead, in the manner described.

JOHN AVIL.
WILLIAM PUGH.

Witnesses as to signing of JOHN AVIL:
GEO. W. THURSTON,
E. K. ALLISON.

Witnesses as to signing of WILLIAM PUGH:
T. K. BENTON,
H. B. REDFIELD.